No. 670,004. Patented Mar. 19, 1901.
J. F. NORMILE.
AUTOMATIC FOUNTAIN COFFEE POT.
(Application filed July 30, 1900.)
(No Model.)
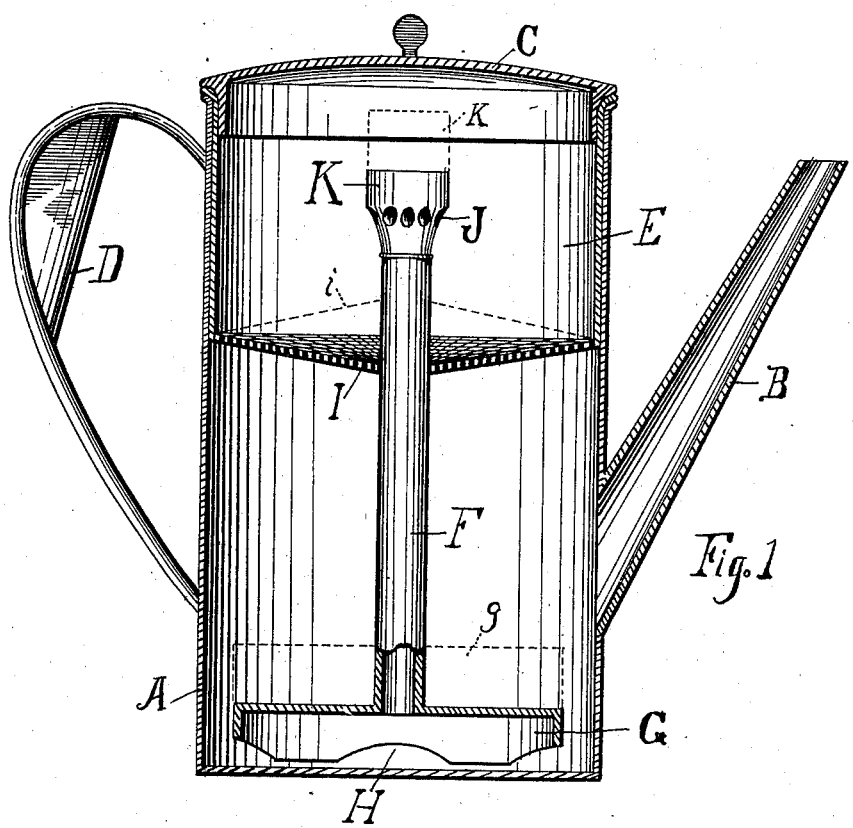
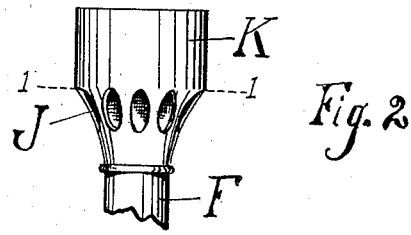
Witnesses.
Charles H. Sprackman
Herbert Simons
Inventor.
John F. Normile
by H. Boved Schermerhorn
Attorney

UNITED STATES PATENT OFFICE.

JOHN F. NORMILE, OF PHILADELPHIA, PENNSYLVANIA.

AUTOMATIC FOUNTAIN COFFEE-POT.

SPECIFICATION forming part of Letters Patent No. 670,004, dated March 19, 1901.

Application filed July 30, 1900. Serial No. 25,314. (No model.)

*To all whom it may concern:*

Be it known that I, JOHN F. NORMILE, a citizen of the United States, residing in the city and county of Philadelphia, in the State of Pennsylvania, have invented a new and useful Improvement in Automatic Fountain Coffee-Pots, of which the following is a specification.

My invention relates to that class of coffee-pots or steeping devices in general in which the coffee or other substance to be steeped is contained in a compartment or receptacle in the upper part of the pot, the boiling water being forced by its ebullition upward through a centrally-located tube and sprayed from above upon the contents of the receptacle, percolating through the perforated or wire-gauze bottom of the same, and thus accomplishing the operation of steeping by the circulation of the boiling water so established.

A hitherto existing defect in steeping devices of the above-described class has been that the coffee or other substance in process of steeping tends to become packed upon the perforated or wire-gauze bottom of the receptacle in such a manner as to retard the steeping. This defect is ordinarily overcome by shaking the pot, and thus effecting a separation and readjustment of the particles of ground coffee.

One object of my invention is to provide a means whereby a slight disturbance of the contents of the ground-coffee receptacle may be automatically effected during the operation of boiling.

A further object of my invention is to provide a means whereby the flow of water from the top of the tube upon the ground coffee may be properly directed and rendered uniform in quantity.

Figure 1 is a view, partly in vertical section, of the entire apparatus. Fig. 2 is a view in perspective, on a larger scale, of the head of the tube shown in Fig. 1.

In Fig. 1, A is a pot of any suitable form, provided with the spout B, cover C, and handle D. E is a removable receptacle fitting closely into the top of the pot A. This receptacle is provided with what I term the "perforated" spring-bottom I, formed, preferably, of wire-gauze. The tube F passes through this perforated spring-bottom I and is firmly attached thereto, but in such manner as to permit a slight vertical movement of said tube, as shown in Fig. 1 and as hereinafter more particularly described. The tube F has attached to its lower end the bottomless chamber G, having a plurality of openings H in the cylindrical side thereof. The tube F is furnished at its upper end with the enlarged head K, having a plurality of openings J.

In Fig. 2 the enlarged head K and openings J are shown on a larger scale.

The operation of my improved coffee-pot is as follows: The pot A is filled with water to any height less than that of the perforated spring-bottom I, and the coffee or other substance to be steeped is placed in the receptacle E. The ebullition of the boiling water in the chamber G forces a stream of water to rise in the tube F, whence it is sprayed through the openings J over the ground coffee or other substance in the receptacle E and percolates through the perforated spring-bottom I, thus establishing a continued circulation of the boiling water, which thoroughly steeps the contents of the receptacle E. The perforated spring-bottom I is slightly conical in form, slanting downward from the circular wall of the receptacle E to the tube F, to which it is attached. This form gives the bottom a limited vertical play, the receptacle E fitting tightly into the top of the pot A and being thus retained firmly in place. The ebullition of the boiling water in the bottomless chamber G from time to time forces up the latter into the position $g$. (Indicated by dotted lines in Fig. 1.) This elevates the tube F, the enlarged head K thereof rising to the position shown at $k$ and the perforated spring-bottom I assuming the position shown by the dotted line at $i$. The weight of the ground coffee in the receptacle E, together with that of the tube F and chamber G, causes the tube and chamber to fall back again into their original positions, as shown in full line, Fig. 1, thus causing the perforated spring-bottom I to alternately assume the position shown at I and $i$, Fig. 1. The movement of the perforated spring-bottom I above described is facilitated by its formation, which assists to spring the tube F back into its original position. This action serves not only to greatly facilitate the steeping effect of the boiling water by preventing the ground coffee or other substance from becoming packed upon said perforated bottom, as it tends to do if undisturbed, but also to increase the flow of water through the tube F by reason of the pumping action of the tube F and chamber G.

In order that the spring-bottom I, Fig. 1, shall properly perform its function by slightly rising and falling, as hereinabove described, it is essential that it be only slightly conical in form and that it be composed of a fine woven fabric, light and yielding in character, adapted, as shown in Fig. 1, to allow a movement of the tube F at once free and of slight extent. The diameter of the head K of the tube F at and above the dotted line 11, Fig. 2, being greater than that below the openings J, said head acts as a reservoir from which the water passes with great steadiness and uniformity through the openings J. The feature in the formation of said openings—namely, the outward projection of the upper sides of said openings beyond the lower—is attended by the advantageous result that the water issuing therefrom is directed downward against the material to be steeped and not sidewise against the inner wall of the receptacle E. Thus through the pumping action of the tube F, in conjunction with the action of the head K and openings J, the liquid is made to circulate through the receptacle E with great uniformity and rapidity. This circulation, in conjunction with the disturbance of the contents of the receptacle E, due to the rise and fall of the perforated spring-bottom I, completes the steeping in a thorough manner and in far less time than is required by existing devices for the purpose, so far as I am aware.

I am aware that prior to my invention automatic fountain-pots for steeping have been made wherein a circulation has been established by means of a chamber in the lower part of the pot communicating with a central tube through which the boiling water rises and is sprayed upon the substance to be steeped, the latter being contained in an upper compartment of the pot. I therefore do not claim such a combination broadly.

What I do claim as my invention, and desire to secure by Letters Patent, is—

1. The combination in an automatic fountain coffee-pot, of a chamber, a tube communicating therewith, said tube having an enlarged head adapted to act as a reservoir for the boiling water rising in said tube, said enlarged head being provided with a plurality of openings the upper edges of which have an outward projection over the lower, adapted to direct the boiling water downward as it issues from said enlarged head, and a receptacle for the ground coffee having a perforated spring-bottom, to which said tube is attached, said spring-bottom being slightly conical in form and adapted to spring slightly upward and downward, actuated by the vertical movement of said tube and chamber substantially as described.

2. In combination in an automatic fountain coffee-pot, the receptacle E provided with the perforated spring-bottom I, said bottom being adapted to allow a vertical play to the tube F, the tube F attached to said spring-bottom I and furnished with the head K and openings J, substantially as described.

3. The combination in an automatic fountain coffee-pot, of a receptacle having a perforated spring-bottom, and a tube terminating at its lower end in a chamber and furnished at its upper end with the openings J and head K, said tube being attached to said spring-bottom and having a limited vertical play therewith.

In testimony whereof I have signed my name to this specification in the presence of two subscribing witnesses.

JOHN F. NORMILE.

Witnesses:
CHARLES H. SPECKMAN,
H. BOVEE SCHERMERHORN.